United States Patent [19]

Sakuma

[11] Patent Number: 5,666,220
[45] Date of Patent: Sep. 9, 1997

[54] OPTICAL SCANNER AND POLYGON MIRROR

[75] Inventor: Nobuo Sakuma, Inagi, Japan

[73] Assignee: Ricoh Company, Ltd., Tokyo, Japan

[21] Appl. No.: 699,210

[22] Filed: Aug. 19, 1996

Related U.S. Application Data

[63] Continuation of Ser. No. 360,048, Dec. 20, 1994, abandoned.

[30] Foreign Application Priority Data

Jan. 26, 1994 [JP] Japan .................. 6-006991

[51] Int. Cl.$^6$ .................................. G02B 26/08
[52] U.S. Cl. .................. 359/208; 359/205; 359/212
[58] Field of Search .................. 359/212, 207, 359/205, 208, 216, 217, 218, 196; 250/235, 236; 346/108, 160

[56] References Cited

U.S. PATENT DOCUMENTS

| | | | |
|---|---|---|---|
| 4,247,160 | 1/1981 | Brueggemann | 359/208 |
| 4,367,014 | 1/1983 | Howden | 156/60 |
| 4,756,585 | 7/1988 | Kaneko et al. | 359/218 |
| 4,759,593 | 7/1988 | Kessler | 359/208 |
| 4,884,856 | 12/1989 | Takayasu et al. | 359/218 |
| 4,915,465 | 4/1990 | Sugiura | 359/217 |
| 5,080,457 | 1/1992 | Fetzer et al. | 359/208 |
| 5,233,454 | 8/1993 | Sakuma et al. | 359/218 |
| 5,457,550 | 10/1995 | Baba et al. | 359/18 |

FOREIGN PATENT DOCUMENTS

| | | | |
|---|---|---|---|
| 63-124017 | 5/1988 | Japan . | |
| 0015231 | 1/1990 | Japan | 359/208 |

OTHER PUBLICATIONS

"Plastic–Molded Total–Reflection Type Polygonal Laser Beam Deflector" 12 Jul. 1993, Sano et al., p. 1, Figs. 3a–b.

*Primary Examiner*—Paul M. Dzierzynski
*Assistant Examiner*—Darren E. Schuberg
*Attorney, Agent, or Firm*—Oblon, Spivak, McClelland, Maier & Neustadt, P.C.

[57] ABSTRACT

In an optical scanner, a light beam from a light source device is incident to a deflecting reflecting face of an optical deflector. The light beam reflected on the deflecting reflecting face is deflected by rotating or swinging the deflecting reflecting face and is incident to a reflective image forming element. The light beam is converged as a light spot onto a scanned face by the reflective image forming element to perform an optical scanning operation. The deflecting reflecting face is substantially parallel to a rotating or swinging axis thereof. The light beam from the light source device is incident to the deflecting reflecting face in a state in which this light beam is inclined with respect to an axial perpendicular face perpendicular to the rotating or swinging axis. An optical axis of the reflective image forming element is inclined with respect to the axial perpendicular face such that this optical axis approaches the incident deflected light beam emitted from the deflecting reflecting face. In this optical scanner, a scanning line curve is effectively reduced.

3 Claims, 9 Drawing Sheets

FIELD CURVATURE

SCANNING LINE CURVE

SCANNING CHARACTERISTICS

FIG. 8a  FIELD CURVATURE

FIG. 8b  SCANNING LINE CURVE

FIG. 8c  SCANNING CHARACTERISTICS

OPTICAL SCANNER AND POLYGON MIRROR

This application is a Continuation of application Ser. No. 08/360,048, filed on Dec. 20, 1994, now abandoned.

BACKGROUND OF THE INVENTION

1. Field of the Invention

The present invention relates to an optical scanner and a polygon mirror used in this optical scanner.

2. Description of the Related Art

In a well-known optical scanner, a light beam is emitted from a light source device and is deflected and converged as a light spot onto a scanned face by an image forming optical system to perform an optical scanning operation.

For example, a reflective image forming element is proposed as the image forming optical system in the optical scanner in Japanese Patent Application Laying Open (KOKAI) No. 1-220221. This reflective image forming element uses a reflecting mirror having an image forming function in this patent specification.

When the reflective image forming element is used as the image forming optical system, the deflected light beam is reflected on the side of an optical deflector by the reflective image forming element. Therefore, it is necessary to separate the optical path of a light beam incident to the reflective image forming element from the optical path of a light beam reflected on the reflective image forming element. In a simplest method of this optical path separation, directions of the incident and reflected light beams are different from each other in a direction corresponding and parallel to a cross scanning direction.

However, in this method, no scanning line as a locus of the light spot is formed as a straight line so that a so-called scanning line curve is caused as is known.

In the optical scanner, the optical deflector for deflecting the light beam from the light source device is generally constructed by a polygon mirror. In a method for manufacturing the polygon mirror, plastic is molded in a polygonal columnar shape by using a die and a reflecting film is formed as a deflecting reflecting face in a circumferential face portion of this plastic. However, in this manufacturing method, a plastic portion forming the deflecting reflecting face is parallel to a rotating axis of the polygon mirror. Accordingly, it is necessary to open and take out the die in a direction perpendicular to the rotating axis so as to take a plastic molded product out of the die. Therefore, a molding operation is complicated and the molding die is expensive.

SUMMARY OF THE INVENTION

It is therefore a first object of the present invention to provide an optical scanner for effectively reducing the above scanning line curve.

A second object of the present invention is to provide a novel polygon mirror for easily drawing a molded product out of a die and cheaply manufactured.

In accordance with a first construction of the present invention, the above first object can be achieved by an optical scanner in which a light beam from a light source device is incident to a deflecting reflecting face of an optical deflector, and the light beam reflected on the deflecting reflecting face is deflected by rotating or swinging the deflecting reflecting face and is incident to a reflective image forming element and is converged as a light spot onto a scanned face by the reflective image forming element to perform an optical scanning operation;

the deflecting reflecting face being substantially parallel to a rotating or swinging axis thereof;

the light beam from the light source device being incident to the deflecting reflecting face in a state in which this light beam is inclined with respect to an axial perpendicular face perpendicular to the rotating or swinging axis; and an optical axis of the reflective image forming element being inclined with respect to the axial perpendicular face such that this optical axis approaches the incident deflected light beam emitted from the deflecting reflecting face.

In accordance with a second construction of the present invention, the above first object can be also achieved by an optical scanner in which a light beam from a light source device is incident to a deflecting reflecting face of an optical deflector, and the light beam reflected on the deflecting reflecting face is deflected by rotating or swinging the deflecting reflecting face and is incident to a reflective image forming element and is converged as a light spot onto a scanned face by the reflective image forming element to perform an optical scanning operation;

the deflecting reflecting face being inclined a small angle with respect to a rotating or swinging axis thereof;

the light beam from the light source device being incident to the deflecting reflecting face in a state in which this light beam is inclined with respect to an axial perpendicular face perpendicular to the rotating or swinging axis; and an optical axis of the reflective image forming element being inclined with respect to the axial perpendicular face such that this optical axis approaches the incident deflected light beam emitted from the deflecting reflecting face.

In accordance with a third construction of the present invention, the above first object can be also achieved by an optical scanner in which a light beam from a light source device is incident to a deflecting reflecting face of an optical deflector, and the light beam reflected on the deflecting reflecting face is deflected by rotating or swinging the deflecting reflecting face and is incident to a reflective image forming element and is converged as a light spot onto a scanned face by the reflective image forming element to perform an optical scanning operation;

the deflecting reflecting face being inclined a small angle with respect to a rotating or swinging axis thereof;

the light beam from the light source device being incident to the deflecting reflecting face substantially in parallel with an axial perpendicular face perpendicular to the rotating or swinging axis; and an optical axis of the reflective image forming element being inclined with respect to the axial perpendicular face such that this optical axis approaches the incident deflected light beam emitted from the deflecting reflecting face.

In accordance with a fourth construction of the present invention, the above second object can be achieved by a polygon mirror comprising a reflecting film formed on each of slanting face portions of an angular cut head cone formed by plastic molding and having a small vertical angle; and a deflecting reflecting face inclined a small angle with respect to a rotating axis of this deflecting reflecting face.

In each of the first to third constructions, the above scanning line curve is effectively reduced.

In the fourth construction, a molded product is easily drawn out of a die and the polygon mirror is cheaply manufactured.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical scanner and a polygon mirror in the present invention will next be described in detail with reference to the accompanying drawings.

In the basic construction of an optical scanner in the present invention, a light beam from a light source device is incident to a deflecting reflecting face of an optical deflector. The light beam reflected on the deflecting reflecting face is deflected by rotating or swinging the deflecting reflecting face and is incident to a reflective image forming element. The light beam is then converged as a light spot onto a scanned face by the reflective image forming element to perform an optical scanning operation.

The light source device has a light source section constructed by combining a light emitting source such as a laser diode (LD), a light emitting diode (LED), etc. with a lens system. The light source section generally emits a divergent light beam, a parallel light beam or a convergent light beam.

Otherwise, a linear image forming optical system such as a cylindrical lens, etc. can be arranged as a portion of the light source device as in each of embodiments of the present invention described later. The linear image forming optical system converges the light beam emitted from the light source section only in a cross scan-corresponding direction, and focuses and forms this light beam as a linear image extending in a main scan-corresponding direction in the vicinity of the deflecting reflecting face. The cross scan-corresponding direction is set to a direction corresponding and parallel to a cross scanning direction on a virtual optical path provided by linearly developing an optical path from the light source section to the scanned face. The main scan-corresponding direction is set to a direction corresponding and parallel to a main scanning direction on this virtual optical path.

The optical deflector can be constructed by using a well-known polygon mirror, a well-known rotary dihedral mirror, a well-known rotary unifacial mirror or a galvanomirror. Each of the polygon mirror, the dihedral mirror and the rotary unifacial mirror is formed by a so-called tenon type mirror, a pyramidal mirror, etc. The polygon mirror can be formed in a polygonal columnar shape generally known or in the shape of an angular cut head cone in accordance with a fourth construction Of the present invention.

When the optical deflector is constructed by the polygon mirror, the rotary dihedral mirror or the rotary unifacial mirror, the light beam is deflected by rotating the deflecting reflecting face. When the optical deflector is constructed by the galvanomirror, the light beam is deflected by swinging the deflecting reflecting face.

As mentioned above, the reflective image forming element is constructed by a concave mirror as a reflecting mirror having an image forming function. The reflective image forming element has a function for performing an optical scanning operation at an equal speed in addition to the image forming function. Namely, the reflective image forming element can have a so-called fθ function, etc. when the light beam is deflected by rotating the deflecting reflecting face at an equal speed, and can have an f·sinθ function, etc. when the light beam is deflected by swinging the deflecting reflecting face. Further, field curvature and characteristics of the above functions can be corrected by using an aspherical surface as the reflecting face, etc.

An optical scanner having a first construction of the present invention is characterized in the following points in the above construction.

Namely, the deflecting reflecting face of the optical deflector is substantially parallel to a rotating or swinging axis thereof. The light beam from the light source device is incident to the deflecting reflecting face in a state in which this light beam is inclined with respect to an axial perpendicular face perpendicular to this rotating or swinging axis.

An optical axis of the reflective image forming element is inclined with respect to the axial perpendicular face such that this optical axis approaches the incident deflected light beam emitted from the deflecting reflecting face.

An optical scanner having a second construction of the present invention is characterized in the following points in the above construction.

Namely, the deflecting reflecting face of the optical deflector is inclined a small angle with respect to a rotating or swinging axis thereof. The light beam from the light source device is incident to the deflecting reflecting face in a state in which this light beam is inclined with respect to an axial perpendicular face perpendicular to this rotating or swinging axis.

An optical axis of the reflective image forming element is inclined with respect to the axial perpendicular face such that this optical axis approaches the incident deflected light beam emitted from the deflecting reflecting face.

An optical scanner having a third construction of the present invention is characterized in the following points in the above construction.

Namely, the deflecting reflecting face of the optical deflector is inclined a small angle with respect to a rotating or swinging axis thereof. The light beam from the light source device is incident to the deflecting reflecting face in a state in which this light beam is substantially parallel to an axial perpendicular face perpendicular to this rotating or swinging axis.

An optical axis of the reflective image forming element is inclined with respect to the axial perpendicular face such that this optical axis approaches the incident deflected light beam emitted from the deflecting reflecting face.

In the above second or third construction, the small angle formed between the deflecting reflecting face of the optical deflector and the rotating or swinging axis thereof is preferably ranged from ±0.5 to ±6 degrees.

The reflective image forming element may be fixedly arranged within the optical scanner in accordance with an optical arrangement in design. However, it is desirable to finely adjust a position and a posture (a direction of the optical axis, etc.) of the reflective image forming element so as to correct a shift from a designing value of a scanning line curve caused by an error in mutual assembly of optical elements, etc.

The polygon mirror having the fourth construction can be used for the optical deflector in the optical scanner having each of the second and third constructions. In this polygon mirror, a reflecting film is formed on each of slanting face portions of an angular cut head cone formed by plastic molding and having a small vertical angle. A deflecting reflecting face of the polygon mirror is inclined a small angle with respect to a rotating axis thereof. This small angle is preferably ranged from ±0.5 to ±6 degrees.

Figure 1:
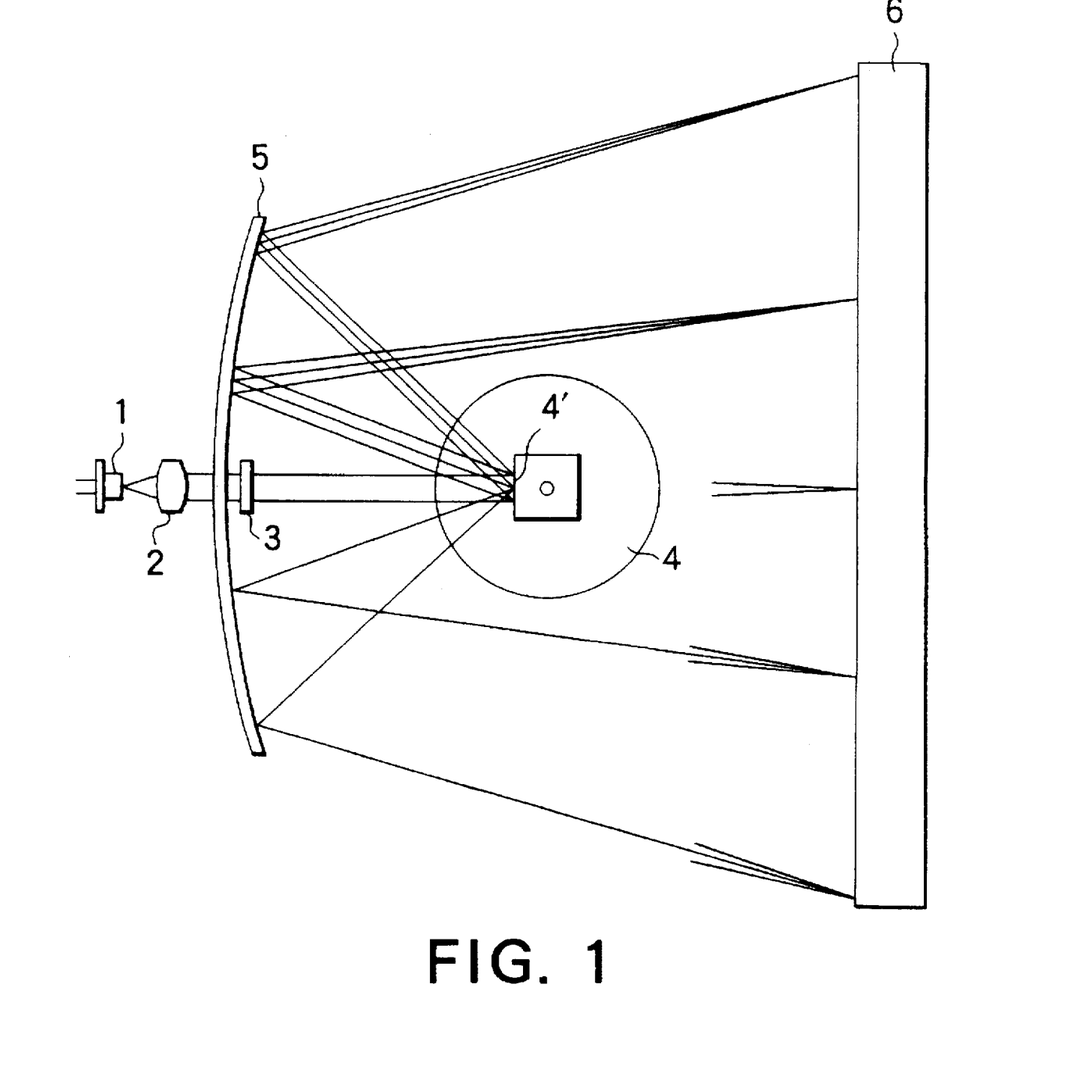
FIG. 1 is a plan view showing the optical arrangement of an optical scanner of the present invention.

FIG. 1 is a plan view typically showing the construction of an optical scanner in the present invention. This typical construction is common to optical scanners having first to third constructions of the present invention.

A light emitting source 1 is constructed by a laser diode (LD) or a light emitting diode (LED). A light beam emitted from the light emitting source 1 is changed by a coupling lens 2 to a divergent light beam having a reduced divergent property, a parallel light beam or a convergent light beam. In the example of FIG. 1, the coupling lens 2 is constructed by a collimator lens so that the light beam from the light emitting source 1 is changed to a parallel light beam. The light beam emitted from the coupling lens 2 is incident to a cylindrical lens 3 as a linear image forming optical system. The light beam is then converged by this cylindrical lens 3 only in a cross scan-corresponding direction. Thus, the light beam is focused and formed as a linear image extending in a main scan-corresponding direction in the vicinity of a deflecting reflecting face 4' of an optical deflector 4. The light emitting source 1, the coupling lens 2 and the cylindrical lens 3 constitute a light source device.

The light beam reflected on the deflecting reflecting face 4' is incident to a reflective image forming element 5 as a deflected light beam. The light beam is then converged as a light spot onto a scanned face by a converging action of the reflective image forming element 5. A photoconductive photosensitive body 6 is formed in the shape of a drum and is arranged such that a generating line of this photosensitive body 6 is in conformity with the scanned face.

Figure 2A:
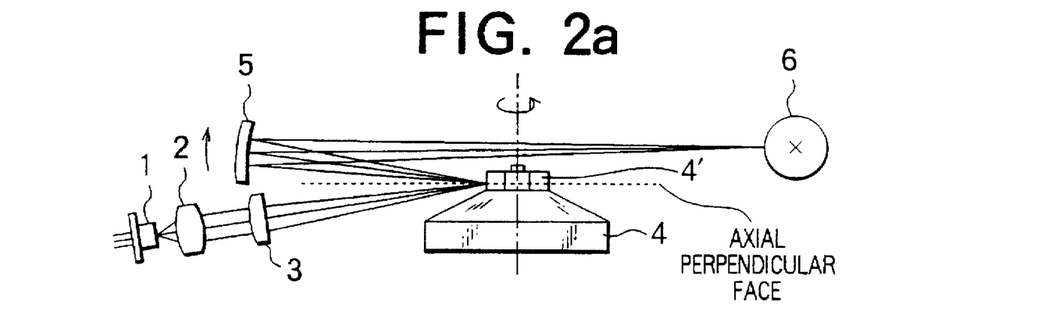
FIG. 2a is a side view of the optical arrangement of an optical scanner having a first construction of the present invention.
Figure 2B:
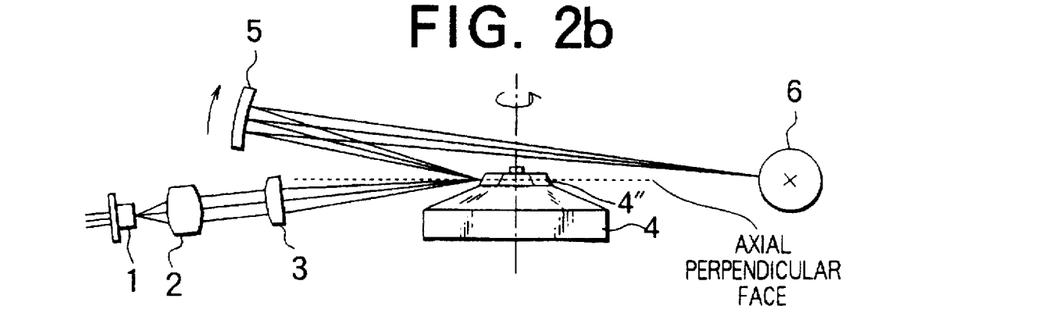
FIG. 2b is a side view of the optical arrangement of an optical scanner having a second construction of the present invention.
Figure 2C:
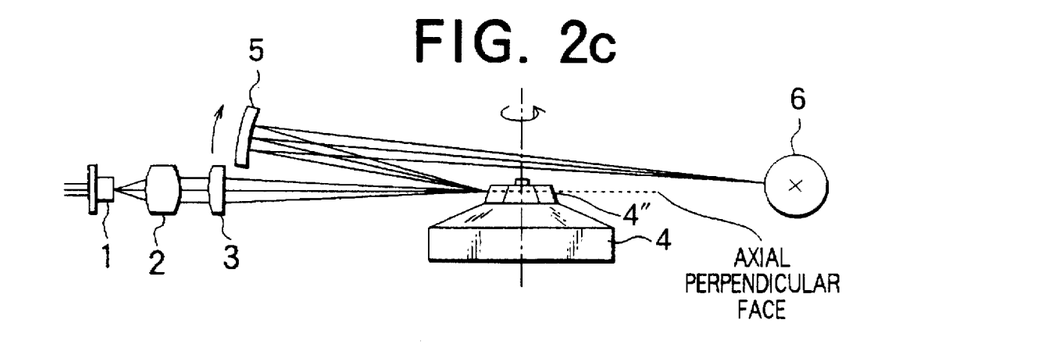
FIG. 2c is a side view of the optical arrangement of an optical scanner having a third construction of the present invention.

Each of FIGS. 2a to 2c is a side view of the optical arrangement of the optical scanner shown in FIG. 1. FIG. 2a is a side view of the optical arrangement of the optical scanner having the first construction of the present invention. FIG. 2b is a side view of the optical arrangement of the optical scanner having the second construction of the present invention. FIG. 2c is a side view of the optical arrangement of the optical scanner having the third construction of the present invention.

In the case of FIG. 2a, the optical deflector 4 rotates a generally known prismatic polygon mirror by a rotating drive mechanism. The deflecting reflecting face 4' of the polygon mirror is substantially parallel to a rotating axis of the polygon mirror. Accordingly, the light beam from the light source device is incident to the deflecting reflecting face 4' in a state in which this light beam is inclined with respect to an axial perpendicular face perpendicular to the rotating axis of the polygon mirror. The number of deflecting reflecting faces of the polygon mirror is set to 4 in the example of FIG. 1, but may be set to another value such as 5, 6, 8, etc.

As shown in FIG. 2a, the light beam from the light source device is incident to the deflecting reflecting face 4' in a state in which the light beam is slantingly emitted below the axial perpendicular face and is further emitted rightward, slantingly and upward. The light beam is then reflected on the deflecting reflecting face 4' and is emitted slantingly, leftward and upward and is incident to the reflective image forming element 5. The light beam is reflected on the reflective image forming element 5 and is converged as a light spot onto the photosensitive body 6 so that the photosensitive body 6 is scanned by this light beam.

In this case, the light beam incident to the reflective image forming element 5 is a parallel light beam with respect to the main scan-corresponding direction, and is a divergent light beam with respect to the cross scan-corresponding direction. With respect to this divergent light beam, a position of the above linear image is set to a starting point of divergence. In other words, the light spot is focused and formed as an image by an image forming action of the reflective image forming element 5. In this image forming action of the reflective image forming element 5, an object point is located at infinity on a light source side in the main scan-corresponding direction, and is located in the position of the linear image in the cross scan-corresponding direction. Accordingly, the reflective image forming element 5 is anamorphic.

Here, the scanned face is considered as a plane extending in a vertical direction in FIG. 2a and coming in contact with the photosensitive body 6.

An optical axis of the reflective image forming element 5 is shown by a chain line in FIG. 2a. When this optical axis of the reflective image forming element 5 is parallel to the above axial perpendicular face, a locus of the light spot is formed as a curve convex downward on the scanned face so that a scanning line curve is caused. This is because an incident position of the deflected light beam incident to the reflective image forming element 5 is shifted on the upper side of a reflecting face of the reflective image forming element 5 in FIG. 2a as this incident position is separated from the position of an optical axis of the reflective image forming element 5.

Therefore, in the first construction of the present invention shown in FIG. 2a, the optical axis of the reflective image forming element 5 is inclined in the clockwise direction with respect to the axial perpendicular face such that this optical axis approaches the incident deflected light beam emitted from the deflecting reflecting face 4'. In such a construction, the incident position of the deflected light beam incident to the reflective image forming element 5 is shifted on the upper side of the reflecting face of the reflective image forming element 5 as this incident position is separated from the position of the optical axis. Thus, the reflected light beam tends to be strongly directed downward in FIG. 2a so that the above scanning line curve convex downward can be effectively reduced and restrained in an allowable range.

An inclination angle of the optical axis of the reflective image forming element 5 is set such that the scanning line curve is reduced as much as possible.

Figure 2D:
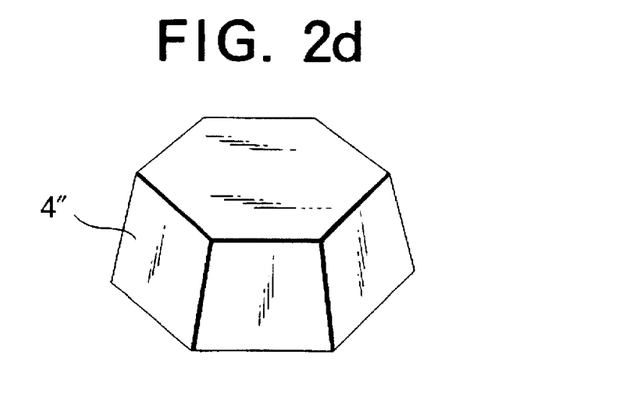
FIG. 2d is a view showing one example of a polygon mirror having a fourth construction of the present invention.
Figure 3A:
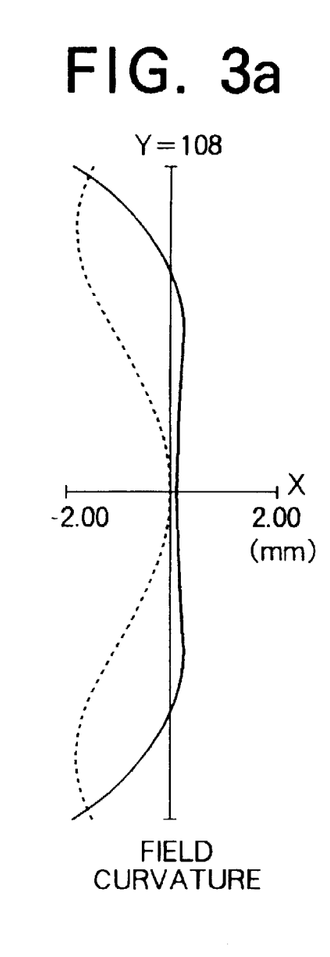
FIGS. 3a to 3c are diagrams respectively showing field curvature, a scanning line curve and scanning characteristics in a concrete example 1.
Figure 3B:
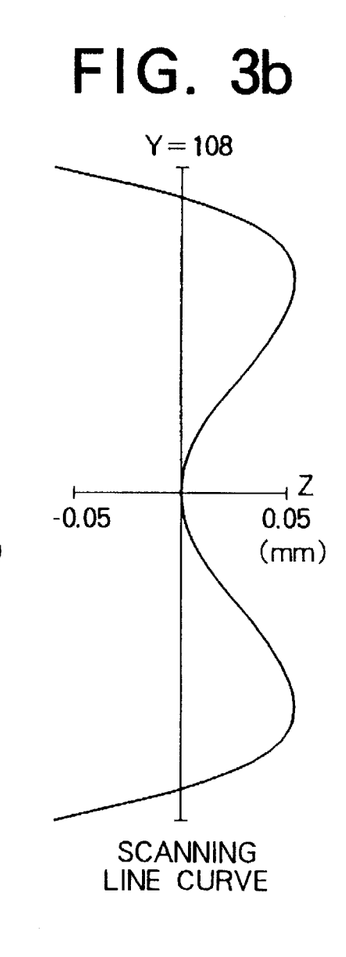
Figure 3C:
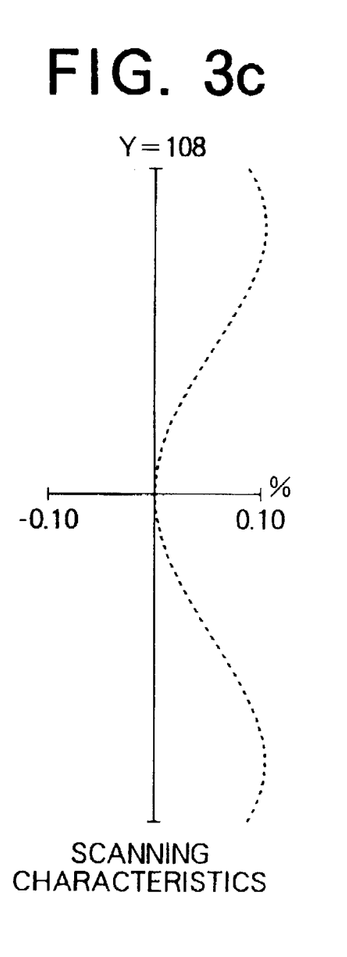
Figure 4A:
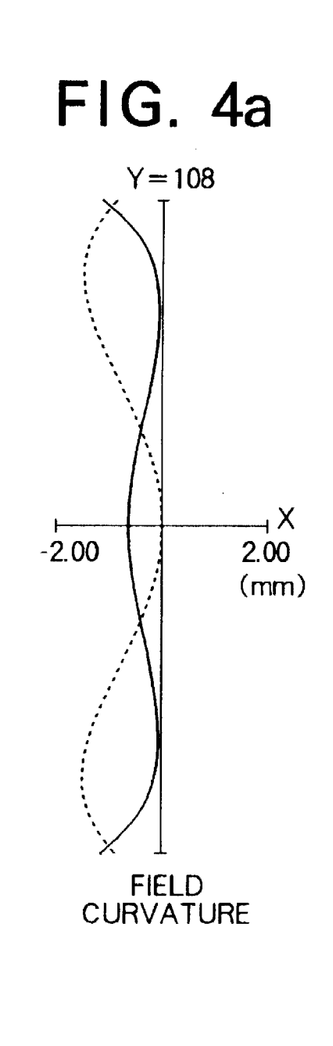
FIGS. 4a to 4c are diagrams respectively showing field curvature, a scanning line curve and scanning characteristics in a concrete example 2.
Figures 4B, 4C:
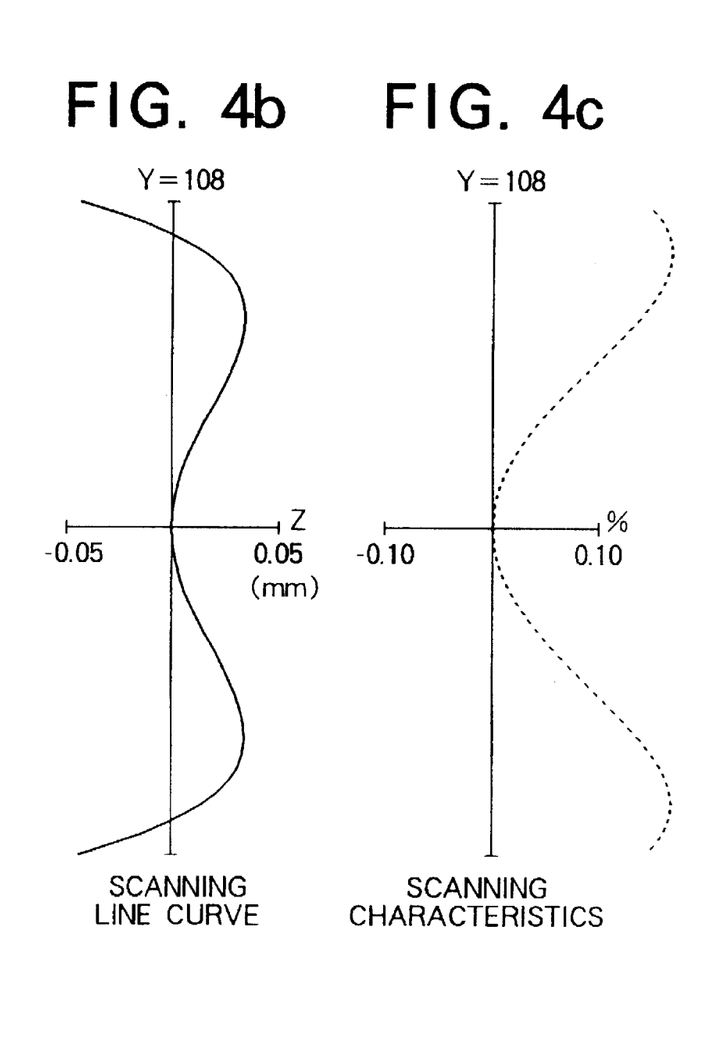
Figure 5A:
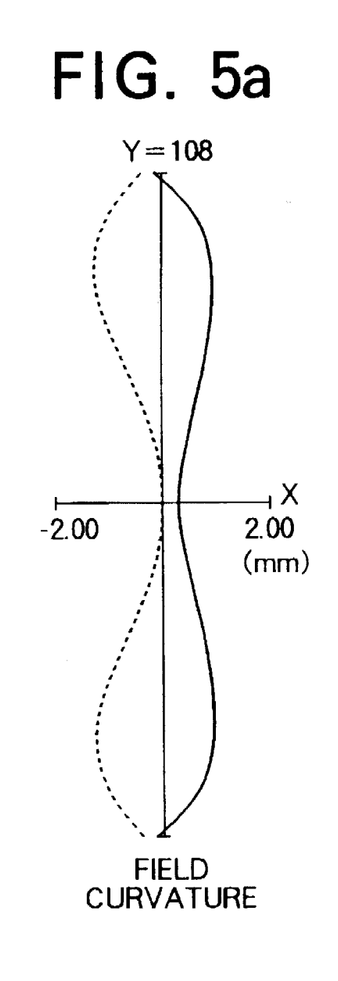
FIGS. 5a to 5c are diagrams respectively showing field curvature, a scanning line curve and scanning characteristics in a concrete example 5.
Figure 5B:
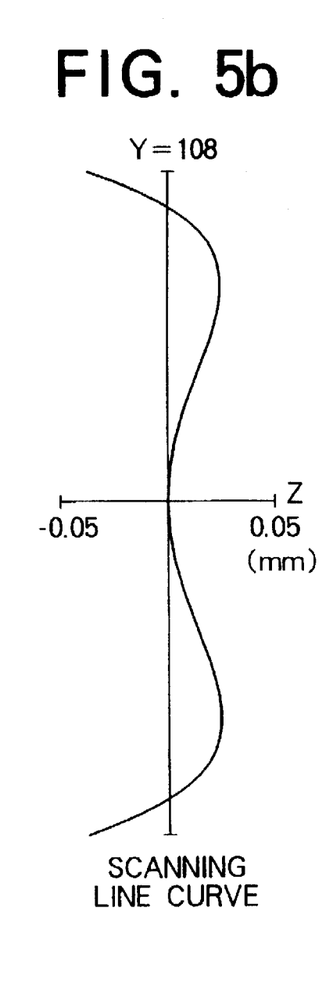
Figure 5C:
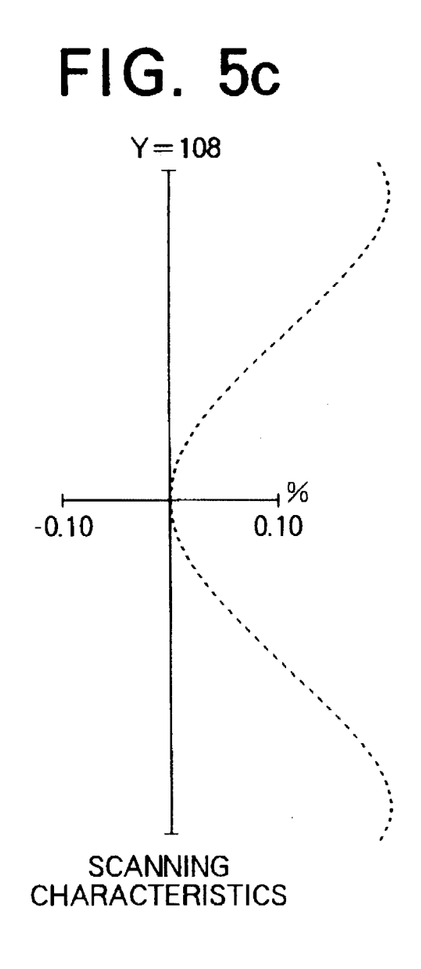
Figures 6A, 6B:
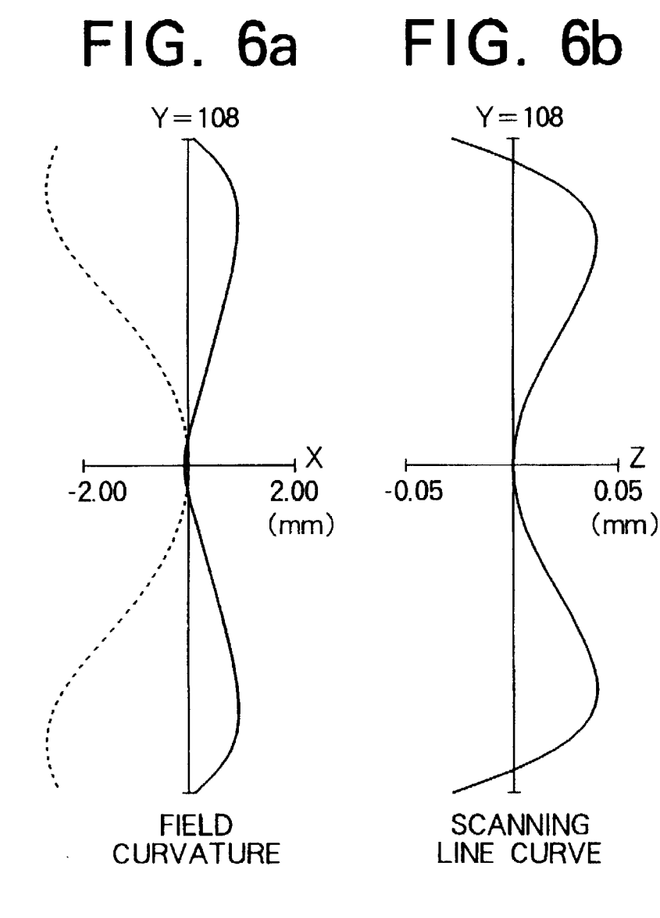
FIGS. 6a to 6c are diagrams respectively showing field curvature, a scanning line curve and scanning characteristics in a concrete example 4.
Figure 6C:
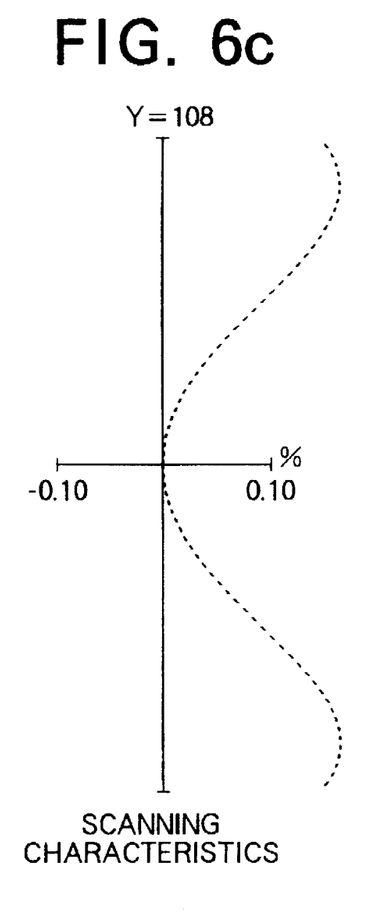
Figure 7A:
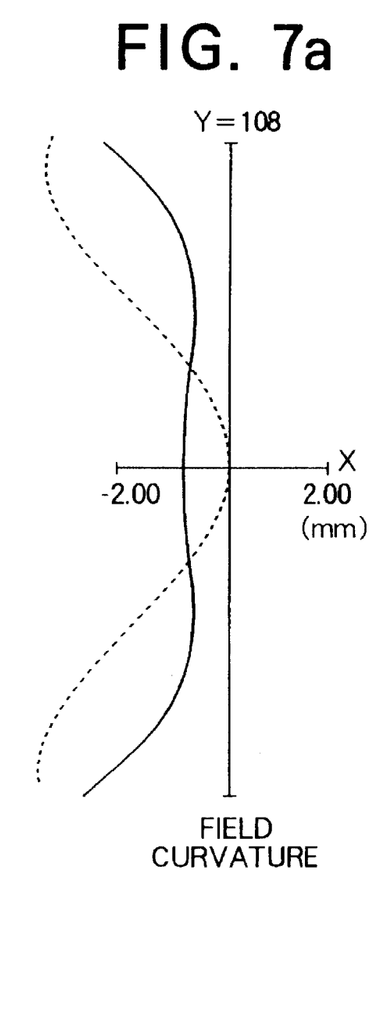
FIGS. 7a to 7c are diagrams respectively showing field curvature, a scanning line curve and scanning characteristics in a concrete example 5.
Figure 7B:
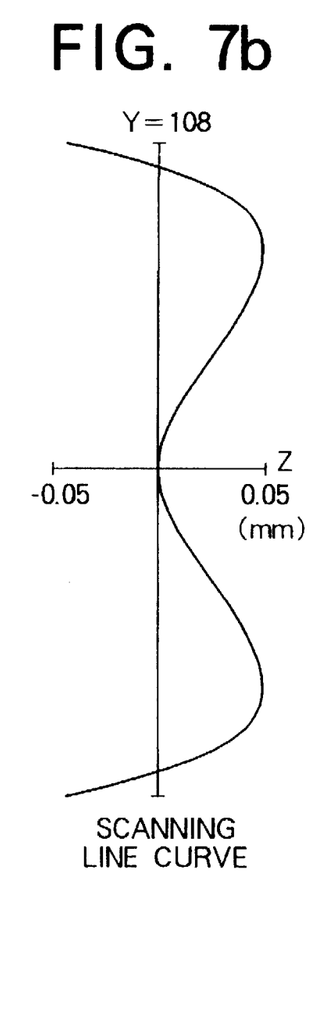
Figure 7C:
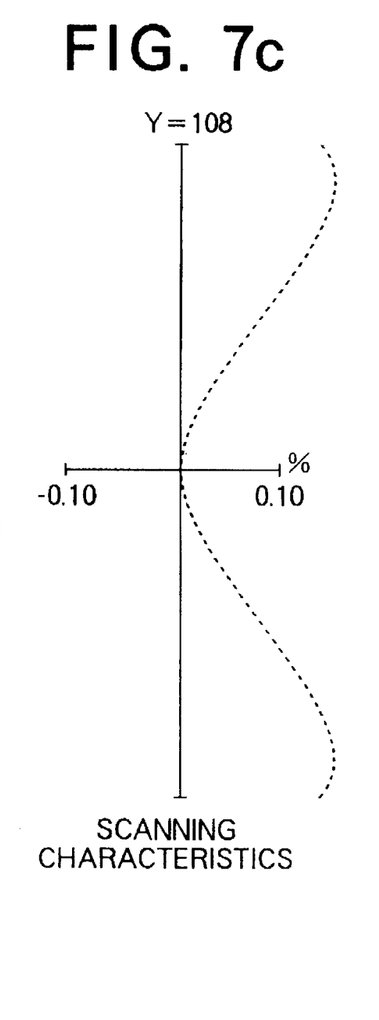
Figure 8A:
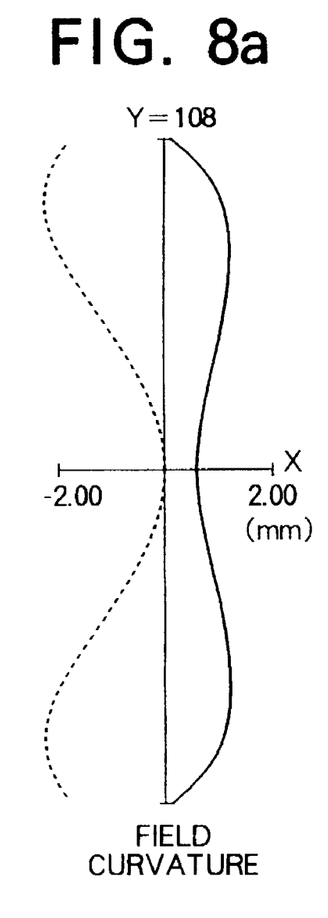
FIGS. 8a to 8c are diagrams respectively showing field curvature, a scanning line curve and scanning characteristics in a concrete example 8.
Figure 8B:
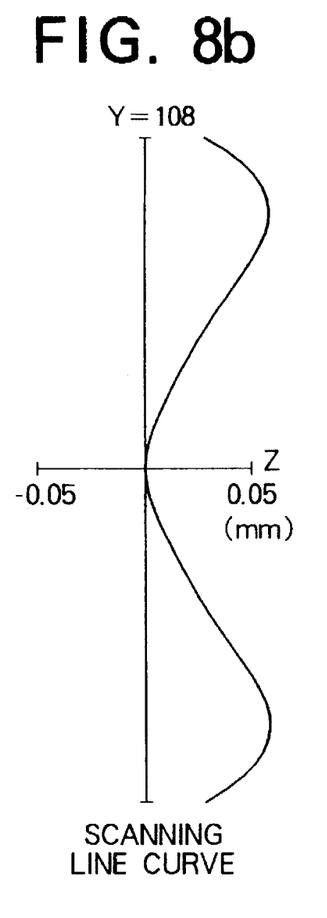
Figure 8C:
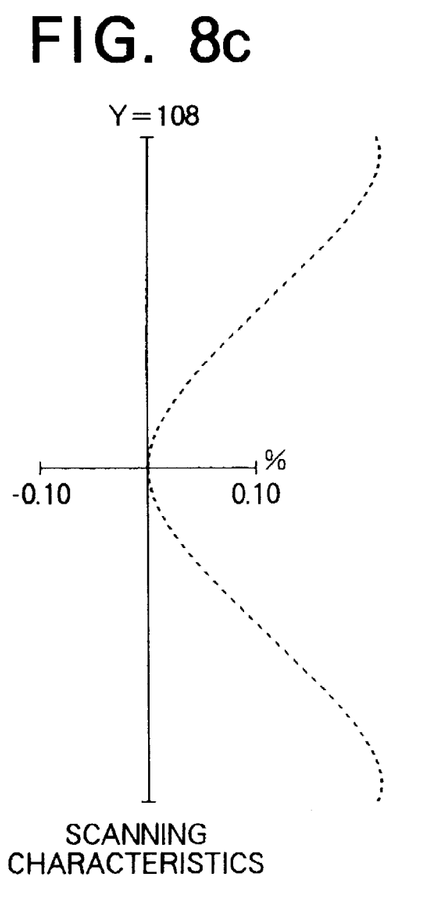
Figure 9A:
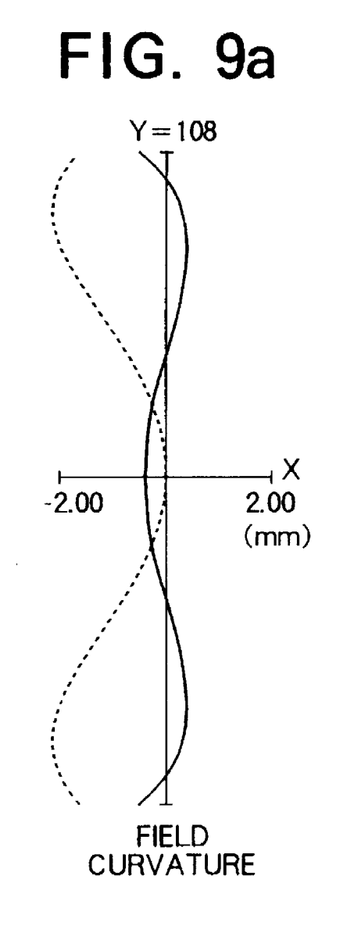
FIGS. 9a to 9c are diagrams respectively showing field curvature, a scanning line curve and scanning characteristics in a concrete example 7.
Figure 9B:
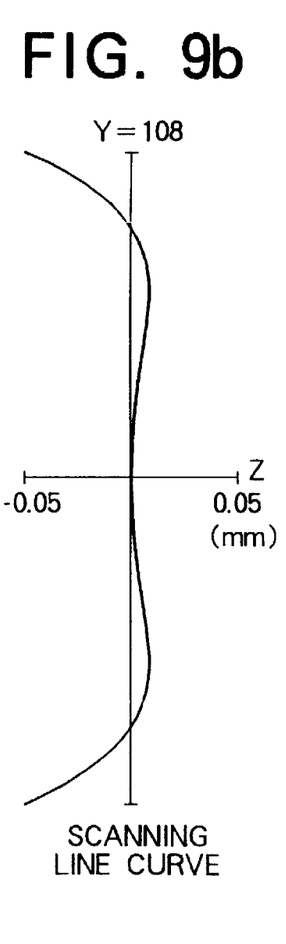
Figure 9C:
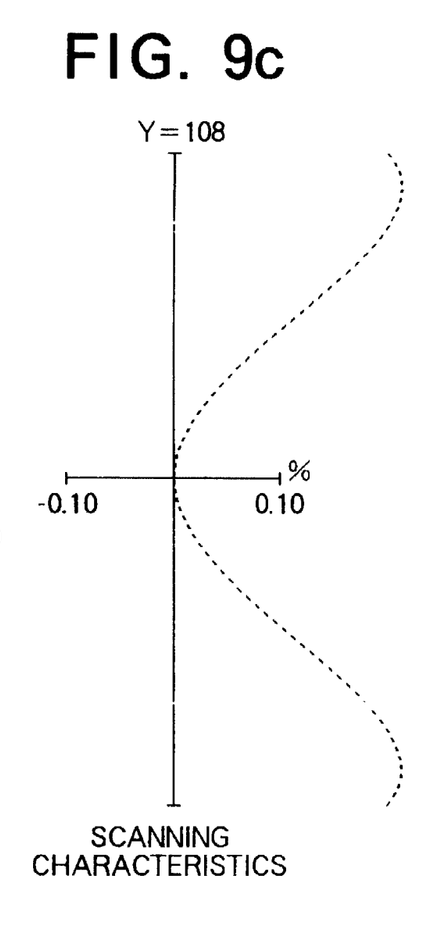

In the case of FIG. 2b, the optical deflector 4 also rotates the polygon mirror. In this case, the polygon mirror has an angular cut head cone shape as shown in FIG. 2d. In the example of FIG. 2b, the optical deflector 4 has six deflecting reflecting faces 4", but the number of deflecting reflecting faces is not limited to six. For example, a suitable number of deflecting reflecting faces equal to or greater than three deflecting reflecting faces can be formed. A deflecting reflecting face 4" of the polygon mirror is inclined a small angle approximately ranged from 0.5 to 6 degrees with respect to the rotating axis of the polygon mirror. The light beam from the light source device is incident to the deflecting reflecting face 4" in a state in which this light beam is inclined with respect to an axial perpendicular face perpendicular to the rotating axis of the polygon mirror.

Namely, the light beam from the light source device is incident to the deflecting reflecting face 4" in a state in which the light beam is slantingly emitted below the axial perpendicular face and is further emitted rightward, slantingly and upward. The light beam is then reflected on the deflecting reflecting face 4" and is emitted slantingly, leftward and upward and is incident to the reflective image forming element 5. The light beam is reflected on the reflective image forming element 5 and is converged as a light spot onto the photosensitive body 6 so that the photosensitive body 6 is scanned by this light beam.

In this case, an optical axis of the reflective image forming element 5 is shown by a chain line in FIG. 2b. When this optical axis of the reflective image forming element 5 is parallel to the axial perpendicular face, a locus of the light spot is also formed as a curve convex downward on the scanned face so that a scanning line curve is caused. Therefore, in the second construction of the present invention shown in FIG. 2b, the optical axis of the reflective image forming element 5 is inclined in the clockwise direction with respect to the axial perpendicular face such that this optical axis approaches the incident deflected light beam emitted from the deflecting reflecting face 4". In such a construction, an incident position of the deflected light beam incident to the reflective image forming element 5 is shifted on the upper side of a reflecting face of the reflective image forming element 5 as this incident position is separated from the position of the optical axis. Thus, the reflected light beam tends to be strongly directed downward in FIG. 2b so that the above scanning line curve convex downward can be effectively reduced and restrained in an allowable range.

An inclination angle of the optical axis of the reflective image forming element 5 is set such that the scanning line curve is reduced as much as possible.

In the case of FIG. 2c, the optical deflector 4 rotates the polygon mirror. Similar to the example of FIG. 2b, a deflecting reflecting face 4" of the polygon mirror is inclined a small angle approximately ranged from 0.5 to 6 degrees with respect to the rotating axis of the polygon mirror. The light beam from the light source device is incident to the deflecting reflecting face 4" substantially in parallel with an axial perpendicular face perpendicular to the rotating axis of the polygon mirror.

Namely, the light beam from the light source device is incident to the deflecting reflecting face 4" in parallel with the axial perpendicular face, but the light beam reflected on the deflecting reflecting face 4" is inclined twice the above small angle since the deflecting reflecting face 4" is inclined the small angle with respect to the axial perpendicular face. The light beam reflected on the deflecting reflecting face 4" is then emitted slantingly, leftward and upward and is incident to the reflective image forming element 5. The light beam reflected on the reflective image forming element 5 is converged as a light spot onto the photosensitive body 6 so that the photosensitive body 6 is scanned by this light beam.

In this case, an optical axis of the reflective image forming element 5 is shown by a chain line in FIG. 2c. When this optical axis of the reflective image forming element 5 is parallel to the axial perpendicular face, a locus of the light spot is also formed as a curve convex downward on the scanned face so that a scanning line curve is caused. Therefore, in the third construction of the present invention shown in FIG. 2c, the optical axis of the reflective image forming element 5 is inclined in the clockwise direction with respect to the axial perpendicular face such that this optical axis approaches the incident deflected light beam emitted from the deflecting reflecting face 4". In such a construction, an incident position of the deflected light beam incident to the reflective image forming element 5 is shifted on the upper side of a reflecting face of the reflective image forming element 5 as this incident position is separated from the position of the optical axis. Thus, the reflected light beam tends to be strongly directed downward in FIG. 2c so that the above scanning line curve convex downward can be effectively reduced and restrained in an allowable range.

An inclination angle of the optical axis of the reflective image forming element 5 is set such that the scanning line curve is reduced as much as possible.

Concrete embodiments of the present invention will next be explained.

Concrete examples of the optical arrangement explained with reference to each of FIGS. 1 and 2 will first be described.

In the following concrete examples 1 to 7, the light beam from the light emitting source 1 in the light source device is changed by the coupling lens 2 to a light beam having a reduced divergent property. This light beam is then focused and formed as a linear image extending in the main scan-corresponding direction in the vicinity of each of the deflecting reflecting faces 4' and 4" by a converting action of the cylindrical lens 3.

In each of the concrete examples, "Rm" shows a radius of curvature of a reflecting face of the reflective image forming element 5 in the main scan-corresponding direction. "Rs" shows a radius of curvature of the reflecting face of the reflective image forming element 5 in the cross scan-corresponding direction. "So" shows a distance between the reflective image forming element 5 and an object point in the main scan-corresponding direction with respect to the light beam incident to the reflective image forming element. This object point is a starting point of divergence of the light beam having a reduced divergent property caused by the coupling lens 2. The distance So is set to be negative in a direction from the reflecting face of the reflective image forming element to a light source side. "Lo" shows a distance between each of the deflecting reflecting faces 4' and 4" and the reflective image forming element 5 when an image height is set to zero. Units of these Rm, Rs, So and Lo are set to mm.

A deflecting angle shows a deflecting angle region of the light beam deflected by the optical deflector (formed by the polygon mirror). An incident angle shows an angle formed between the axial perpendicular face and the light beam incident to each of the deflecting reflecting faces 4' and 4" from the light source device. This incident angle is set to be positive in the cases of FIGS. 2a and 2b. An inclination angle of a deflecting face shows an angle formed between the deflecting reflecting face of the polygon mirror and the rotating axis of the polygon mirror. This inclination angle of the deflecting face is set to be positive in the clockwise direction. An inclination angle of the reflective image forming element shows an inclination angle of the optical axis of the reflective image forming element in the clockwise direction with respect to the axial perpendicular face. Units of the above deflecting angle, the above incident angle, the inclination angle of the deflecting face and the inclination angle of the reflective image forming element are set to degrees.

CONCRETE EXAMPLE 1

Rm=246.5, Rs=113.9, So=−548.2, Lo=78.7, deflecting angle=±45, incident angle=0, inclination angle of deflecting face=6, inclination angle of reflective image forming element=10.2

CONCRETE EXAMPLE 2

Rm=246.5, Rs=113.9, So=−548.2, Lo=78.7, deflecting angle=±45, incident angle=0, inclination angle of deflecting face=4, inclination angle of reflective image forming element=6.7

CONCRETE EXAMPLE 3

Rm=246.5, Rs=113.9, So=−548.2, Lo=78.7, deflecting angle=±45, incident angle=0, inclination angle of deflecting face=3, inclination angle of reflective image forming element=5

In the above concrete examples 1 to 3, the deflecting reflecting face is inclined a small angle with respect to the rotating axis of the polygon mirror, and the light beam from the light source device is incident to the deflecting reflecting face in parallel with the axial perpendicular face. Accordingly, the concrete examples 1 to 5 relate to the optical scanner having the third construction of the present invention.

CONCRETE EXAMPLE 4

Rm=246.5, Rs=115, So=−548.2, Lo=78.7, deflecting angle=±45, incident angle=6, inclination angle of deflecting face=0, inclination angle of reflective image forming element=8.2

In the concrete example 4, the deflecting reflecting face is parallel to the rotating axis of the polygon mirror. Accordingly, the concrete example 4 relates to the optical scanner having the first construction of the present invention.

CONCRETE EXAMPLE 5

Rm=246.5, Rs=115, So=−548.2, Lo=78.7, deflecting angle=±45, incident angle=6, inclination angle of deflecting face=1, inclination angle of reflective image forming element=6.2

CONCRETE EXAMPLE 6

Rm=246.5, Rs=115, So=−548.2, Lo=78.7, deflecting angle=±45, incident angle=6, inclination angle of deflecting face=−1, inclination angle of reflective image forming element=3

CONCRETE EXAMPLE 7

Rm=246.5, Rs=115, So=−548.2, Lo=78.7, deflecting angle=±45, incident angle=6, inclination angle of deflecting face=−2, inclination angle of reflective image forming element=1.2

In the concrete examples 5 to 7, the deflecting reflecting face is inclined a small angle with respect to the rotating axis of the polygon mirror, and the light beam from the light source device is incident to the deflecting reflecting face in a state in which this light beam is inclined with respect to the axial perpendicular face. Accordingly, the concrete examples 5 to 7 relate to the optical scanner having the second construction of the present invention.

FIGS. 3 to 9 respectively show field curvature, a scanning line curve and scanning characteristics with respect to the concrete examples 1 to 7. In each of FIGS. 3a to 9a, field curvature in a main scanning direction is shown by a broken line and field curvature in a cross scanning direction is shown by a solid line. Each of FIGS. 3b to 9b shows the scanning line curve. The scanning characteristics shown in each of FIGS. 3c to 9c relate to an equal speed property of the optical scanning operation and correspond to fθ characteristics in the case of an fθ lens. In these scanning characteristics, a shift $\Delta(\theta)$ from a function relation $H(\theta)$ providing an ideal equal speed scan is represented by a ratio $\{\Delta(\theta)/H(\theta)\}\times100$ (%) with respect to an ideal function value in a function relation between a deflecting angle θ and an image height H of the light spot. In each of the concrete examples, the field curvature, the scanning line curve and the scanning characteristics are very preferably provided.

The deflecting reflecting face of the polygon mirror as the optical deflector 4 in each of FIGS. 2b and 2c is inclined a small angle with respect to the rotating axis and has an angular cut head cone shape as shown in FIG. 2d. In accordance with a fourth construction of the present invention, such a polygon mirror is manufactured by forming an angular cut head cone by plastic molding, and forming a reflecting film composed of an aluminum evaporation film, etc. on each of slanting face portions of this angular cut head cone. In the polygon mirror in the fourth construction of the present invention, the angular cut head cone can be drawn out of a die in an axial direction in the plastic molding by inclination of each of the slanting face portions. Accordingly, it is not necessary to use a die openable in a direction perpendicular to the rotating axis as in the general polygon mirror. Therefore, the polygon mirror can be manufactured easily, cheaply and precisely.

As mentioned above, a novel optical scanner and a novel polygon mirror can be provided in accordance with the present invention. In the optical scanner having each of the above first to third constructions, it is possible to perform a preferable optical scanning operation in which a scanning line curve is effectively corrected. The polygon mirror having the fourth construction can be manufactured easily, cheaply and precisely since a plastic molded product is easily drawn out of a die. Accordingly, this polygon mirror can be preferably used in the optical deflector of the optical scanner having each of the second and third constructions.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical-scanner for an image forming apparatus in which a light beam from a light source device is incident to a deflecting reflecting face of an optical deflector and wherein the light beam provided by the light source device is formed as a linear image which is incident to the deflecting reflecting face, and the light beam reflected on the deflecting reflecting face is deflected by rotating or swinging the deflecting reflecting face and is incident to a reflective image forming element and is converged as a light spot onto a scanned face by said reflective image forming element to perform an optical scanning operation, said light source device and said reflective image forming element being located on a same side with respect to said deflecting reflecting face;

said deflecting reflecting face being substantially parallel to a rotating or swinging axis thereof;

the light beam from the light source device being incident to said deflecting reflecting face in a state in which this light beam is inclined with respect to an axial perpendicular face perpendicular to said rotating or swinging axis; and an optical axis of said reflective image forming element being inclined with respect to said axial perpendicular face such that this optical axis is inclined with respect to said axial perpendicular face in a direction toward the incident deflected light beam emitted from said deflecting reflecting face so as to correct a scanning line curve.

2. An optical scanner for an image forming apparatus in which a light beam from a light source device is incident to a deflecting reflecting face of an optical deflector, and the light beam reflected on the deflecting reflecting face is deflected by rotating or swinging the deflecting reflecting face and is incident to a reflective image forming element and is converged as a light spot onto a scanned face by said reflective image forming element to perform an optical scanning operation, said light source device and said reflective image forming element being located on a same side with respect to said deflecting reflecting face;

said deflecting reflecting face being inclined a small angle with respect to a rotating or swinging axis thereof;

the light beam from the light source device being incident to said deflecting reflecting face in a state in which this light beam is inclined with respect to an axial perpendicular face perpendicular to said rotating or swinging axis; and an optical axis of said reflective image forming element being inclined with respect to said axial perpendicular face such that this optical axis is inclined with respect to said axial perpendicular face in a direction toward the incident deflected light beam emitted from said deflecting reflecting face so as to correct a scanning line curve, wherein said small angle is in the range of ±0.5 to ±6 degrees.

3. An optical scanner for an image forming apparatus in which a light beam from a light source device is incident to a deflecting reflecting face of an optical deflector, and the light beam reflected on the deflecting reflecting face is deflected by rotating or swinging the deflecting reflecting face and is incident to a reflective image forming element and is converged as a light spot onto a scanned face by said reflective image forming element to perform an optical scanning operation, said light source device and said reflective image forming element being located on a same side with respect to said deflecting reflecting face;

said deflecting reflecting face being inclined a small angle with respect to a rotating or swinging axis thereof;

the light beam from the light source device being incident to said deflecting reflecting face substantially in parallel with an axial perpendicular face perpendicular to said rotating or swinging axis; and an optical axis of said reflective image forming element being inclined with respect to said axial perpendicular face such that this optical axis is inclined with respect to said perpendicular face in a direction toward the incident deflected light beam emitted from said deflecting reflecting face so as to correct a scanning line curve, wherein said small angle is in the range of ±0.5 to ±6 degrees.

* * * * *